Sept. 25, 1945.   S. F. DRAIM   2,385,568
LAWN MOWER
Filed Jan. 31, 1944   2 Sheets-Sheet 2
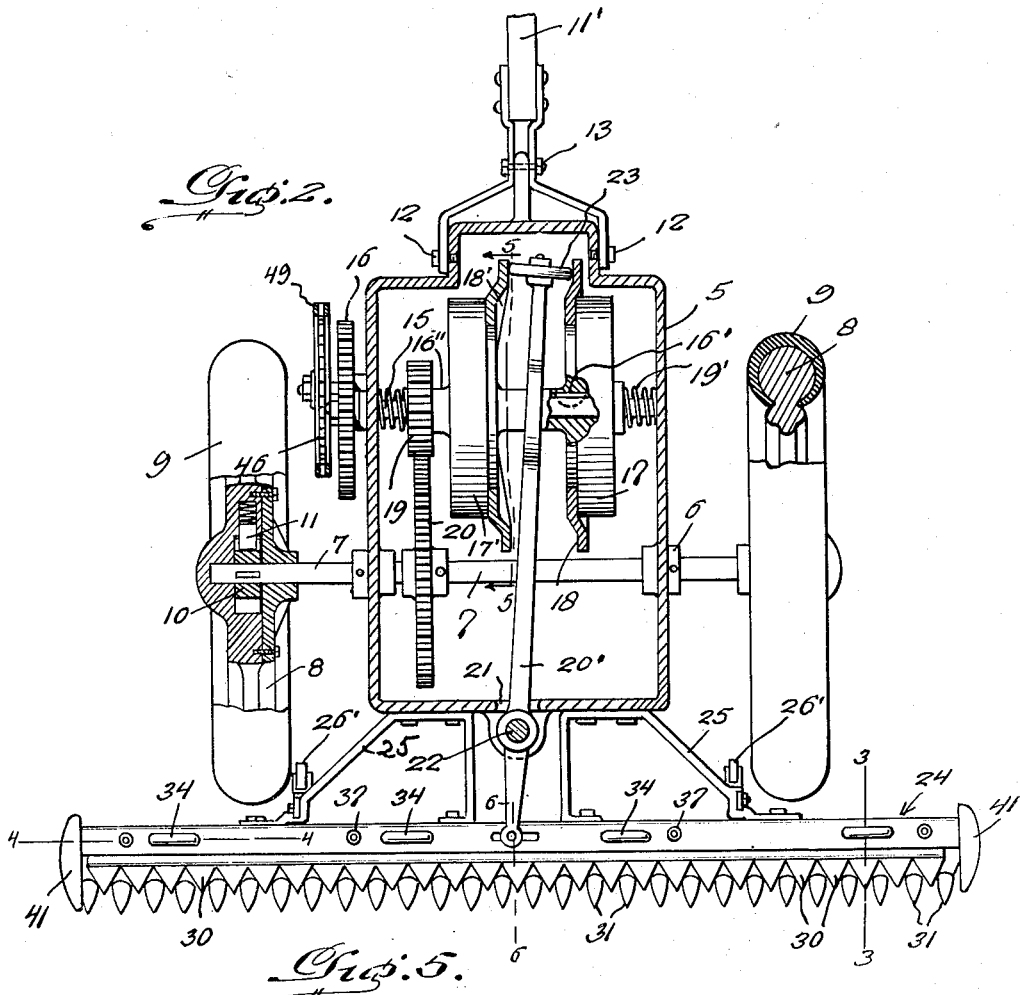
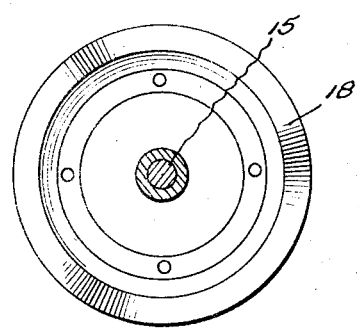
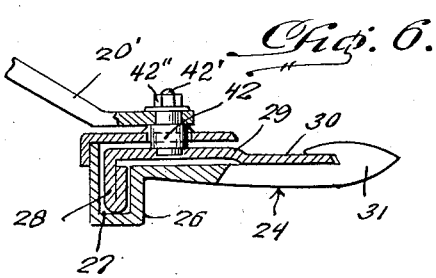
Inventor
Samuel F. Draim,
By
Attorneys Patented Sept. 25, 1945

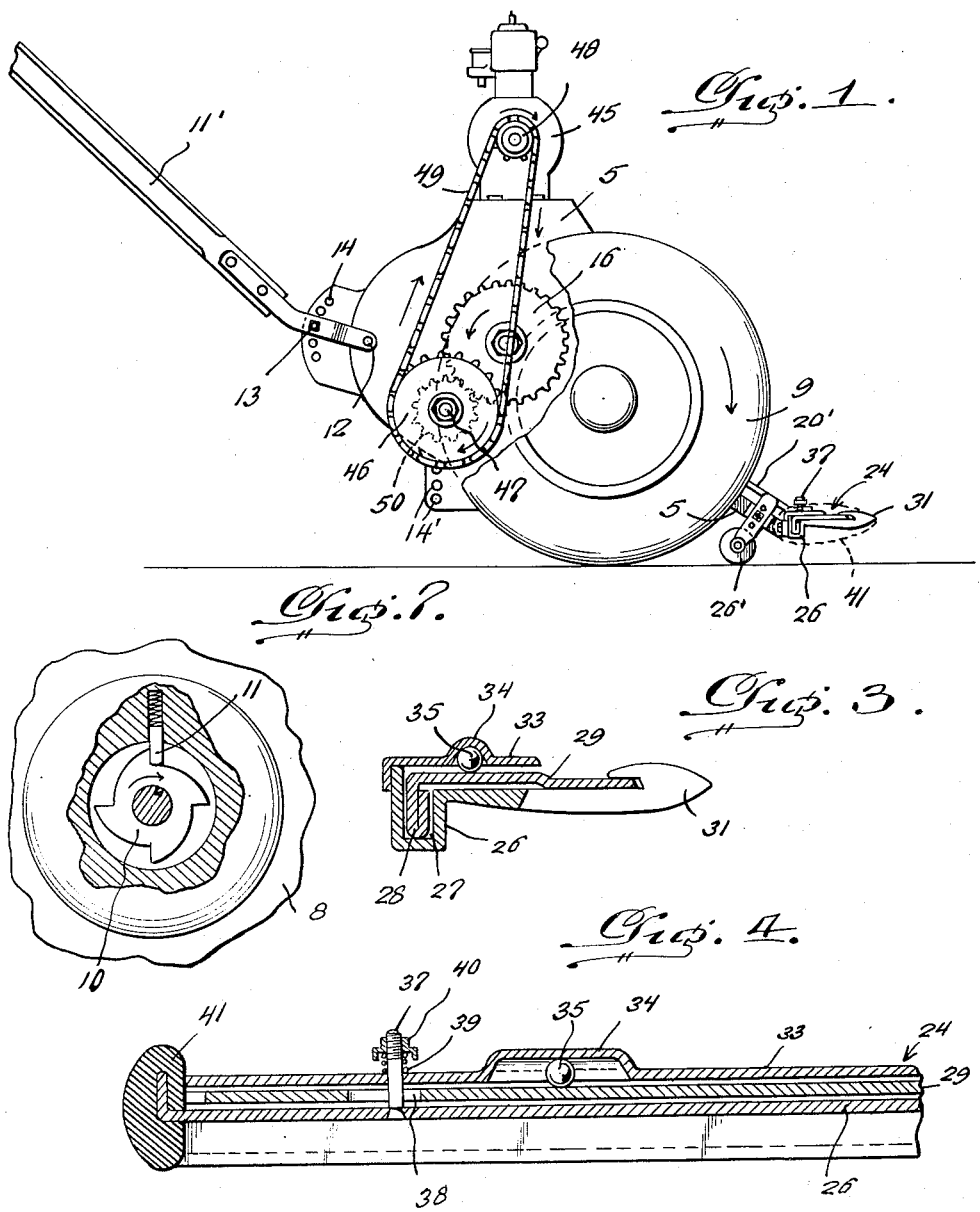

2,385,568

UNITED STATES PATENT OFFICE 2,385,568

LAWN MOWER

Samuel F. Draim, Pascagoula, Miss.

Application January 31, 1944, Serial No. 520,471

1 Claim. (Cl. 56—263)

This invention relates to lawn mowers operable either entirely by hand power or by a power source and manually guided.

The primary object of the invention is the provision of a lawn mower which will successfully cut high and tough growth as well as low tender growth and close to shrubbery and the like without danger of injury thereto or to the mower.

Another object of this invention is the provision of a mower which will cut a swath much greater than the distance between the supporting wheels, so that the wheels may operate over mowed surfaces at all times, permitting much easier operation of the device and eliminates the mashing down of growth prior to the cutting thereof by the wheels.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a side elevation illustrating a lawn mower constructed in accordance with my invention.

Figure 2 is a fragmentary top plan view, partly in section, illustrating the device, with the engine removed.

Figure 3 is a sectional view taken on the line 3—3 of Figure 2.

Figure 4 is a sectional view on the line 4—4 of Figure 2.

Figure 5 is a sectional view on the line 5—5 of Figure 2, looking in the direction of the arrows.

Figure 6 is a sectional view on the line 6—6 of Figure 2.

Figure 7 is a fragmentary sectional view illustrating one of the ratchet mechanisms employed between the ground wheel and its axle.

Referring in detail to the drawings, the numeral 5 indicates a housing provided in opposite side walls thereof with bearings 6 to rotatably support an axle 7 on which are journaled ground wheels 8. It is preferable that the ground wheels 8 be rubber tired, as shown at 9, to permit said wheels to obtain sufficient traction.

Keyed to the axle 7 and removable therefrom are ratchet gears 10 coactive with spring influenced dogs 11 carried by the hubs of the wheels whereby said wheels may be driven by the axle and still be permitted to rotate faster than the axle to compensate for the travel of the wheels on curves. The ratchets 10 being removable from the axles may be reversed thereon so that the wheels may be made to rotate the axle 7 when the device is operated solely by manpower.

A handle 11' is pivotally connected to the rear portion of the housing 5, as shown at 12, and may be adjusted upwardly and downwardly by rearranging a bolt 13 carried by the handle in any one of a series of openings 14 provided in the housing. The rear portion of the housing 5 is also provided with a plurality of openings 14' whereby a clevis or similar device may be adjustably connected thereto for coupling agricultural or garden implements to the device so that it may be used as a tractor for such implements.

A shaft 15 is journaled in the opposite side walls of the housing and one end protrudes beyond the housing to have removably secured thereto a gear 16. The shaft 15 has keyed, splined or similarly secured thereto a unit 16' including fly wheel 17, companion spaced cam 18 and an oppositely disposed integral unit 16" also including a fly wheel 17' and companion spaced cam 18', with a gear 19 meshing with a gear 20 secured on the axle 7. Interposed between the unit 16' and the side walls of the housing are coil springs 19' acting to cushion endwise thrust of the unit 16' on the shaft 15.

An oscillatory pitman 20' operates in a slot 21 provided in the front wall of the housing and is pivotally supported on the front wall of the housing, as shown at 22. The pivot of the pitman is much closer to one end thereof than the other end so that said pitman will have a long portion and a short portion. The short portion of the pitman is arranged exteriorly of the housing while the long portion operates between the cams 18 and 18' and has journaled thereon a roller or cam disc 23 engageable with the cams so that during the rotation of the shaft 15 either by a power source or from the axle 7 will bring about an oscillatory movement to the pitman.

The unit 16' being cushioned by the springs 19' permits operation of the pitman with a minimum amount of vibration and noise.

A cutter assembly 24 operates in front of the housing and is supported thereon by brackets 25 and adjustably connected thereto are ground rollers or small wheels 26' for the purpose of governing the height of cut of the cutter assembly.

The cutter assembly includes a cutter bar 26 secured to the brackets 25 and arranged transversely and forwardly of the housing and the length thereof is much greater than the distance between the ground wheels 8. The cutter bar has a guide channel 27 extending substantially the full length thereof and slidably receives a guide flange 28 forming a part of a sickle blade 29 including teeth 30.

Guard teeth 31 form a part of the bar 26 and slidably receive the teeth 30 and project a limited distance forwardly thereof to prevent obstructions from engaging the teeth and thereby damaging the latter.

Overlying a portion of the sickle blade 29 and mounted on the cutter bar 26 is a cover plate 33 having offsets 34 to receive antifriction bearings 35 that ride the cutter blade to permit the latter to move with a minimum amount of friction.

In order that proper tension be placed on the cutter blade 29, bolts 37 carried by the cutter bar extend through slots 38 in the cutter blade and through the cover plate and have mounted thereon coil springs 39 which bear against nuts 40 on the bolts and the cover plate. The nuts 40 provide means whereby the tension of the springs 39 may be varied on the cover plate and thereby vary the pressure on the cutter blade. The ends of the cutter bar are offset and have mounted thereon cushion end pieces 41 for the purpose of safeguarding shrubbery and the like from the cutter assembly 24 and also to protect the latter when engaged by concrete abutments or the like found close to lawns.

A roller 42 engaging in a depression of the cutter blade extends through a slot in the cover plate and is detachably secured by means of conventional bolt 42' and nut 42" to the forward end of the pitman 20 so that the cutter blade will be made to reciprocate by the pitman. During the reciprocation of the cutter blade any growth caught between the teeth 30 and the guard teeth will be easily severed.

The device may be propelled by a small internal combustion engine, as shown at 45, mounted on the top wall of the housing 5. Any type of drive may be provided between the shaft 15 and the engine 45, as for instance, a sprocket gear 46 may be journaled on a stub shaft 47 on the housing and connected to a sprocket gear 48 on the power takeoff shaft of the engine by an endless sprocket chain 49. The gear 46 is secured to a gear 50 and the latter is in mesh with the gear 16.

From the foregoing description taken in connection with the accompanying drawings, it will be seen that a very efficient lawn mower has been provided which may be propelled manually or made to operate from an internal combustion engine or other suitable power source carried thereby and manually guided. Further, it will be seen that the construction employed for reciprocating the cutter blade of the cutter mechanism is such that the device may operate with a minimum amount of vibration and noise and that the fly wheels 17 of the unit 16' assists in the smoothness of operation of the device.

A device of the kind described will successfully operate to cut either low or high growth and may be readily adjusted for the cutting of either high or low growth and may be conveniently operated in close vicinity to shrubbery and the like without danger of injury thereto.

While I have shown and described the preferred embodiment of my invention, it will be understood that minor changes in construction, combination and arrangement of parts may be made without departing from the spirit and scope of the invention as claimed.

Having thus described my invention, what I claim is:

Operating means for a reciprocating lawn mower cutter and comprising a housing, a portable support for the housing, a shaft journaled in the housing and having drive means operatively connected thereto, a cam unit splined to said shaft and including interconnected spaced-apart cams having opposed cam faces, and fly wheels on the outer faces of the cams, gearing connecting the cam units to said drive means, cushion springs for the cam unit supported by said shaft and bearing against the housing to cushion endwise thrust of the cam unit on the shaft, and cutter-actuating mechanism positioned between the cams for operation thereby.

SAMUEL F. DRAIM.